(12) United States Patent
Yasuda et al.

(10) Patent No.: US 10,907,741 B2
(45) Date of Patent: Feb. 2, 2021

(54) CONTROL VALVE DEVICE

(71) Applicant: NIDEC TOSOK CORPORATION, Kanagawa (JP)

(72) Inventors: Tomohiro Yasuda, Kanagawa (JP); Kenta Kuramochi, Kanagawa (JP); Takanori Ara, Kanagawa (JP); Weiming Chen, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 33 days.

(21) Appl. No.: 16/360,041

(22) Filed: Mar. 21, 2019

(65) Prior Publication Data

US 2019/0301620 A1    Oct. 3, 2019

(30) Foreign Application Priority Data

Mar. 28, 2018    (JP) .................................. 2018-061376

(51) Int. Cl.
    *B01D 29/52*    (2006.01)
    *B01D 29/05*    (2006.01)
    *F16K 11/07*    (2006.01)

(52) U.S. Cl.
    CPC .......... *F16K 11/0708* (2013.01); *B01D 29/05* (2013.01); *B01D 29/52* (2013.01); *B01D 2201/16* (2013.01)

(58) Field of Classification Search
    CPC ............... F16K 11/0708; F16K 27/041; F16K 31/0613; F16K 27/048; B01D 29/05; B01D 29/52; B01D 2201/16
    USPC ............... 210/340, 97, 416.5, 432, 477, 495
    See application file for complete search history.

(56) References Cited

FOREIGN PATENT DOCUMENTS

| JP | 2009079543 | * | 4/2009 |
| JP | 2014532830 | | 12/2014 |

* cited by examiner

Primary Examiner — Madeline Gonzalez
(74) Attorney, Agent, or Firm — JCIPRNET (57) ABSTRACT

The control valve device includes a valve body having a stacked first body and second body. The first body includes a first oil passage, a filter covering an opening of the first oil passage, a first accommodating part recessed from a first boundary surface surrounding the opening of the first oil passage, and two second accommodating parts which are more recessed than the first accommodating part from the first boundary surface on outer sides of opposite end portions of the first accommodating part. The filter includes a filter part covering the opening of the first oil passage and two leaf springs respectively disposed in the two second accommodating parts, and an end portion of each of the leaf springs comes into contact with a first wall surface of the second accommodating parts facing the first oil passage side.

13 Claims, 6 Drawing Sheets

CONTROL VALVE DEVICE

CROSS-REFERENCE TO RELATED APPLICATION

This application claims the priority benefit of Japan Application No. 2018-061376, filed on Mar. 28, 2018. The entirety of the above-mentioned patent application is hereby incorporated by reference herein and made a part of this specification.

BACKGROUND

Technical Field

The disclosure relates to a control valve device.

Description of Related Art

Filters for removing foreign matter contained in a fluid are generally provided in control valve devices that open and close a flow path for a fluid such as oil, water, or gas. For example, a filter provided on an end surface or an outer peripheral surface of a holder of a valve filters a fluid in the vicinity of an opening of a port (for example, see Patent Document 1: Japanese Laid-Open No. 2014-532830). Also, a filter provided between two bodies, for example, between a valve case and a cylinder head cover, performs filter processing in the middle of a flow path (for example, see Patent Document 2: Japanese Patent Laid-Open No. 2009-79543).

However, a filter provided on an outer peripheral surface or the like of a valve may fall off due to an impact or the like. Also, when a filter is provided in the middle of a flow path, operations that require time such as melting and fitting the filter into each body are necessary when assembling a control valve device, and thus production efficiency decreases.

SUMMARY

According to an exemplary embodiment of the disclosure, a control valve device provided includes a valve body provided with a flow path for a fluid and including a valve element that opens and closes the flow path, in which the valve body includes a first body, and a second body stacked on the first body, in which a first oil passage opening at a first boundary surface in the first body adjacent to the second body is provided in the first body, a second oil passage which is a flow path opening at a second boundary surface in the second body adjacent to the first body is provided in the second body, the first body further includes a filter covering the opening of the first oil passage, a first accommodating part recessed in a direction away from the first boundary surface at a certain region surrounding the opening of the first oil passage, and two second accommodating parts which are more recessed than the first accommodating part in the direction away from the first boundary surface on outer sides of opposite end portions of the first accommodating part with the first oil passage interposed therebetween, the filter includes a plate-shaped filter part; and two leaf springs extending from opposite end portions of the filter part and bent in a thickness direction of the filter part, in which the filter part is disposed in the first accommodating part and sandwiched between the first body and the second body to cover the opening of the first oil passage, and the two leaf springs are respectively disposed in the two second accommodating parts and an end portion of each of the leaf springs comes into contact with a first wall surface of each of the second accommodating parts facing the first oil passage side.

DESCRIPTION OF THE EMBODIMENTS

The disclosure simplifies an attachment operation of a filter and to prevent the attached filter from falling off.

According to an exemplary embodiment of the disclosure, an attachment operation of the filter can be simplified and the attached filter can be prevented from falling off.

Hereinafter, a control valve device of an embodiment of the disclosure will be described with reference to the drawings. In the following drawings, scales, the number, or the like of respective structures may be made different from those in an actual structure so that each configuration thereof can be more easily understood.

Also, in the drawings, an XYZ coordinate system is illustrated as a three-dimensional orthogonal coordinate system as appropriate. In the XYZ coordinate system, a Y-axis direction is parallel to a central axis J illustrated in FIG. 2. Unless otherwise specified, a direction parallel to the central axis J illustrated in FIG. 2 will be simply described as an "axial direction," a radial direction with respect to the center axis J will be simply described as a "radial direction," and a circumferential direction with the center axis J as a center, that is, around the axis of the center axis J (θ direction) will be simply described as a "circumferential direction." Also, a side in a +z direction of the Z axis may be referred to as an upper side, and a side in a −z direction may be referred to as a lower side in some cases. Further, the upper side and the lower side are descriptive names used merely for explanation and do not limit actual positional relationships and directions.

Figure 1:
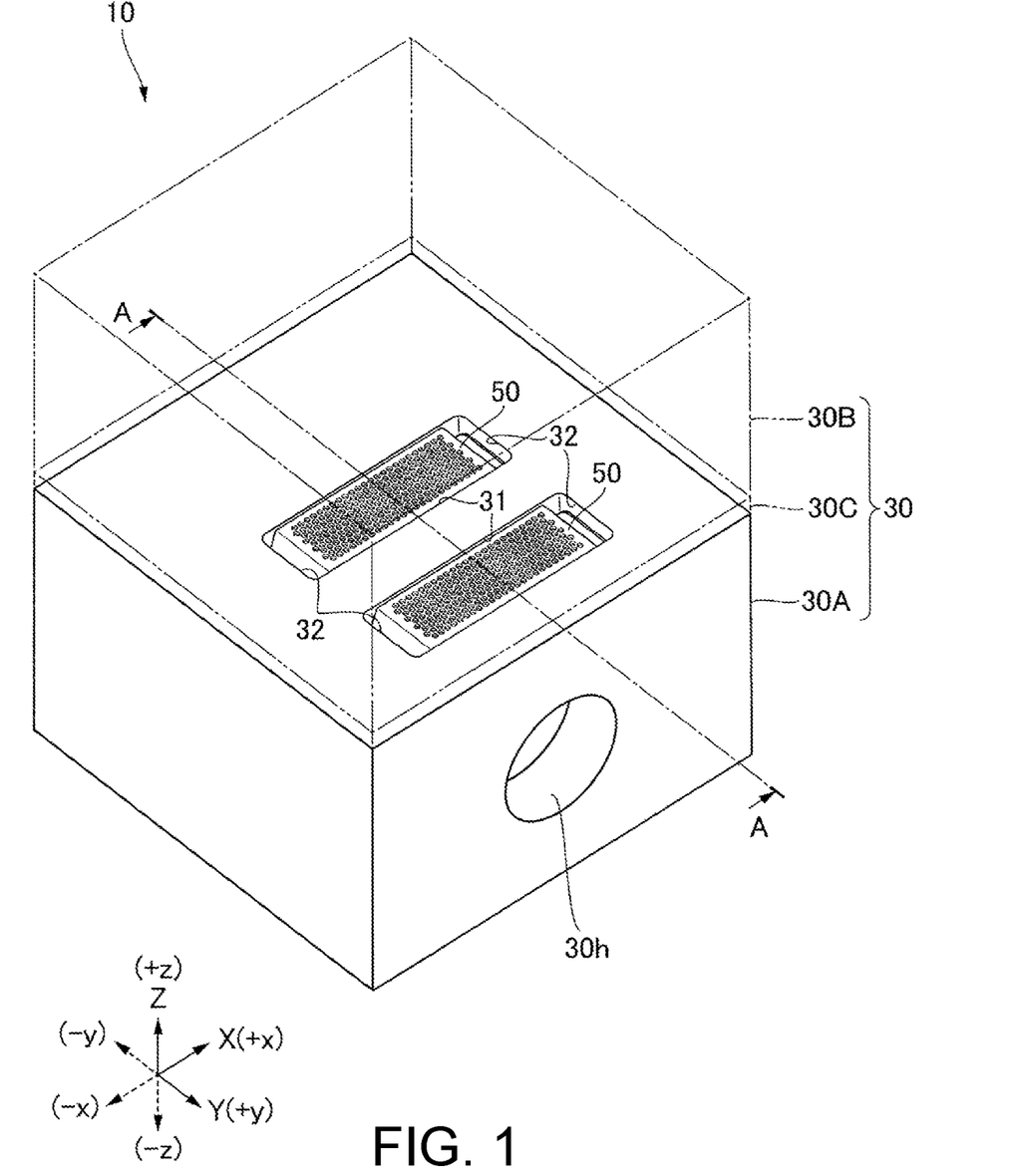
FIG. 1 is a perspective view illustrating a control valve device of one embodiment of the disclosure.

FIG. 1 illustrates a control valve device 10 of the present embodiment.

As illustrated in FIG. 1, the control valve device 10 includes a valve body 30. A solenoid can be attached to the valve body 30. The control valve device 10 of the present embodiment includes an oil passage provided in the valve body 30 and controls an oil pressure by opening and closing the oil passage.

(Valve Body)

The valve body 30 includes a first body 30A and a second body 30B stacked on the first body 30A. The first body 30A is disposed on a lower side in the direction of gravity and may be referred to as a lower body in some cases. The second body 30B is disposed on an upper side of the first body 30A in the direction of gravity and may be referred to as an upper body in some cases. In the present embodiment, the valve body 30 includes a separator plate 30C between the first body 30A and the second body 30B. Due to the separator plate 30C, surfaces of the first body 30A and the second body 30B are able to be brought into close contact with each other.

Figure 2:
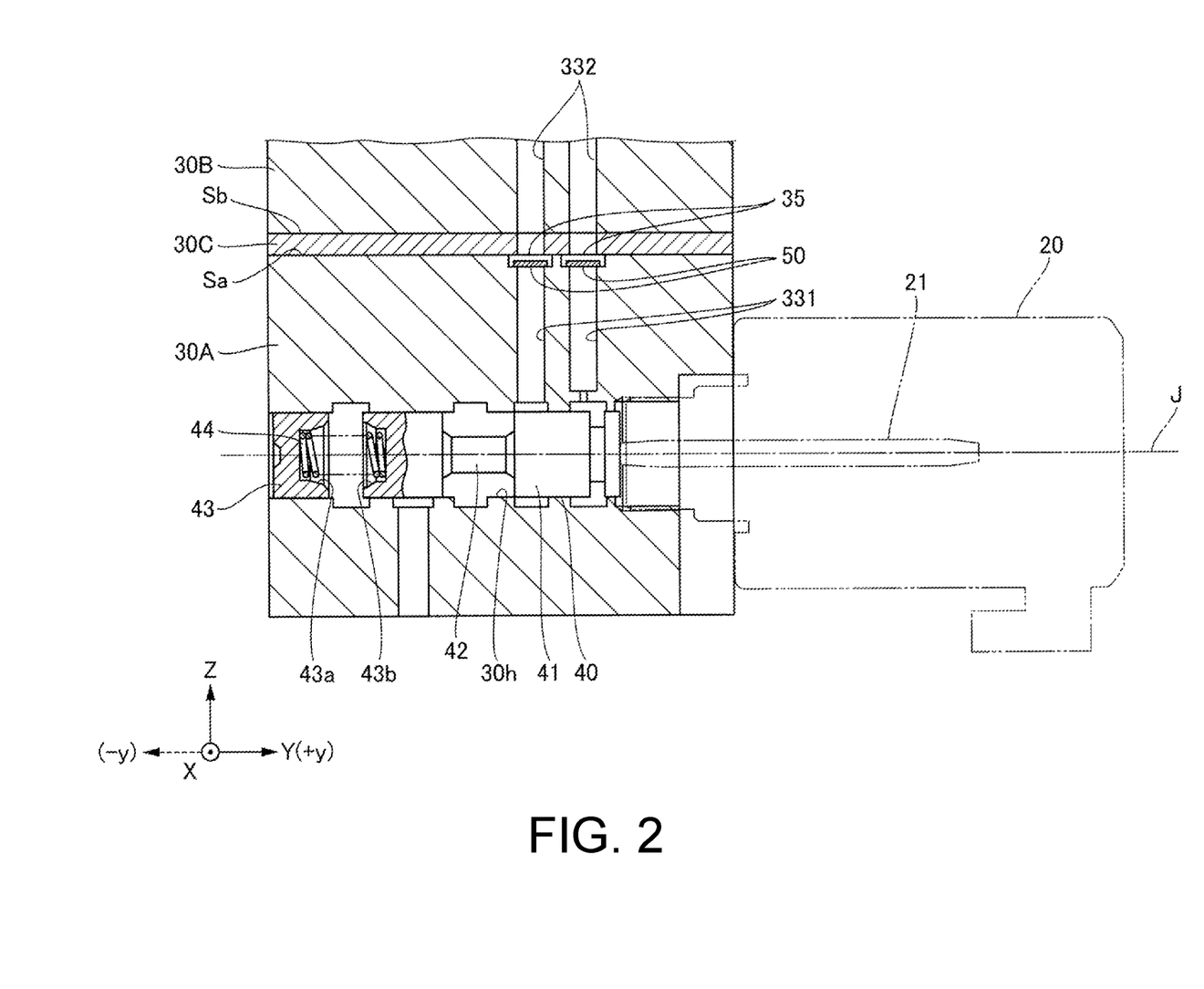
FIG. 2 is a cross-sectional view of the control valve device of FIG. 1.

FIG. 2 is a cross-sectional view of the control valve device 10 taken along line A-A in FIG. 1.

As illustrated in FIG. 2, two first oil passages 331 are provided in the first body 30A. Each of the first oil passages 331 opens at a boundary surface Sa (first boundary surface) in the first body 30A adjacent to the second body 30B which is separated by the separator plate 30C. Also in the second body 30B, two second oil passages 332 are provided. The two second oil passages 332 open at a boundary surface Sb (second boundary surface) in the second body 30B adjacent to the first body 30A which is separated by the separator plate 30C.

The separator plate 30C includes an opening 35 communicating with both the first oil passage 331 of the first body 30A and the second oil passage 332 of the second body 30B. In the present embodiment, the two first oil passages 331 of the first body 30A communicate with the two second oil passages 332 of the second body 30B via the openings 35, respectively. An area of the opening 35 of the separator plate 30C can be made equal to or less than an area of an opening of the first oil passage 331. A size of the opening through which the first oil passage 331 and the second oil passage 332 communicate with each other can be controlled by the area of the opening 35 of the separator plate 30C.

As illustrated in FIG. 2, the valve body 30 includes a valve element 40. In the present embodiment, the first body 30A includes the valve element 40, and the two first oil passages 331 are opened and closed by the valve element 40. Specifically, a through hole 30h in the axial direction is provided in the first body 30A, and the valve element 40 is disposed in the through hole 30h. The through hole 30h communicates with both the first oil passages 331.

The valve element 40 of the present embodiment is a spool valve. As illustrated in FIG. 2, the valve element 40, which is a spool valve, has a columnar shape and includes a first diameter part 41 having a diameter in contact with an inner surface of the through hole 30h and a second diameter part 42 having a smaller diameter than the first diameter part 41. As a material of the valve element 40, a metal such as aluminum having a magnetic permeability different from that of oil can be used. A pin 21 and a solenoid unit 20 which drives the pin 21 in the axial direction due to excitation of a coil can be attached to the other side in the axial direction from the valve element 40, that is, to the +y direction side.

The first body 30A includes a lid member 43 and a spring 44 on one side in the axial direction with respect to the valve element 40 in the through hole 30h, that is, in the −y direction. The lid member 43 has a columnar shape and closes an opening of the through hole 30h on one side in the axial direction. The lid member 43 has a male threaded part provided on an outer circumference thereof and is fixed to the first body 30A, for example, by the male threaded part being screwed into a female threaded part provided on an inner circumferential surface of the through hole 30h. The lid member 43 includes a recessed part 43a recessed on one side in the axial direction. On the other hand, the valve element 40 includes a recessed part 43b recessed on the other side in the axial direction at an end portion on one side in the axial direction. The spring 44 is accommodated in the recessed parts 43a and 43b such that an end portion on one side in the axial direction of the spring 44 is in contact with a bottom surface of the recessed part 43a and an end portion on the other side in the axial direction is in contact with the recessed part 43b, and biases the valve element 40 toward the other side in the axial direction.

When the coil of the solenoid unit 20 is not excited, the valve element 40 is positioned on the other side in the axial direction by a biasing force of the spring 44. When the coil is excited, the pin 21 driven by the solenoid unit 20 moves to one side in the axial direction. When the valve element 40 in contact with the moved pin 21 also moves to one side in the axial direction, a proportion of the opening of each first oil passage 331 communicating with the through hole 30h closed by the first diameter part 41 of the valve element 40 changes. Thereby, an amount of oil flowing through the first oil passage 331, that is, an oil pressure, can be controlled.

(Filter and Accommodating Part of the Filter)

As illustrated in FIGS. 1 and 2, two filters 50 respectively covering the openings of the two first oil passages 331 are provided in the first body 30A. Also, a first accommodating part 31 and two second accommodating parts 32 in which the filter 50 is disposed are provided in the boundary surface Sa of the first body 30A for each filter 50.

Figure 3:
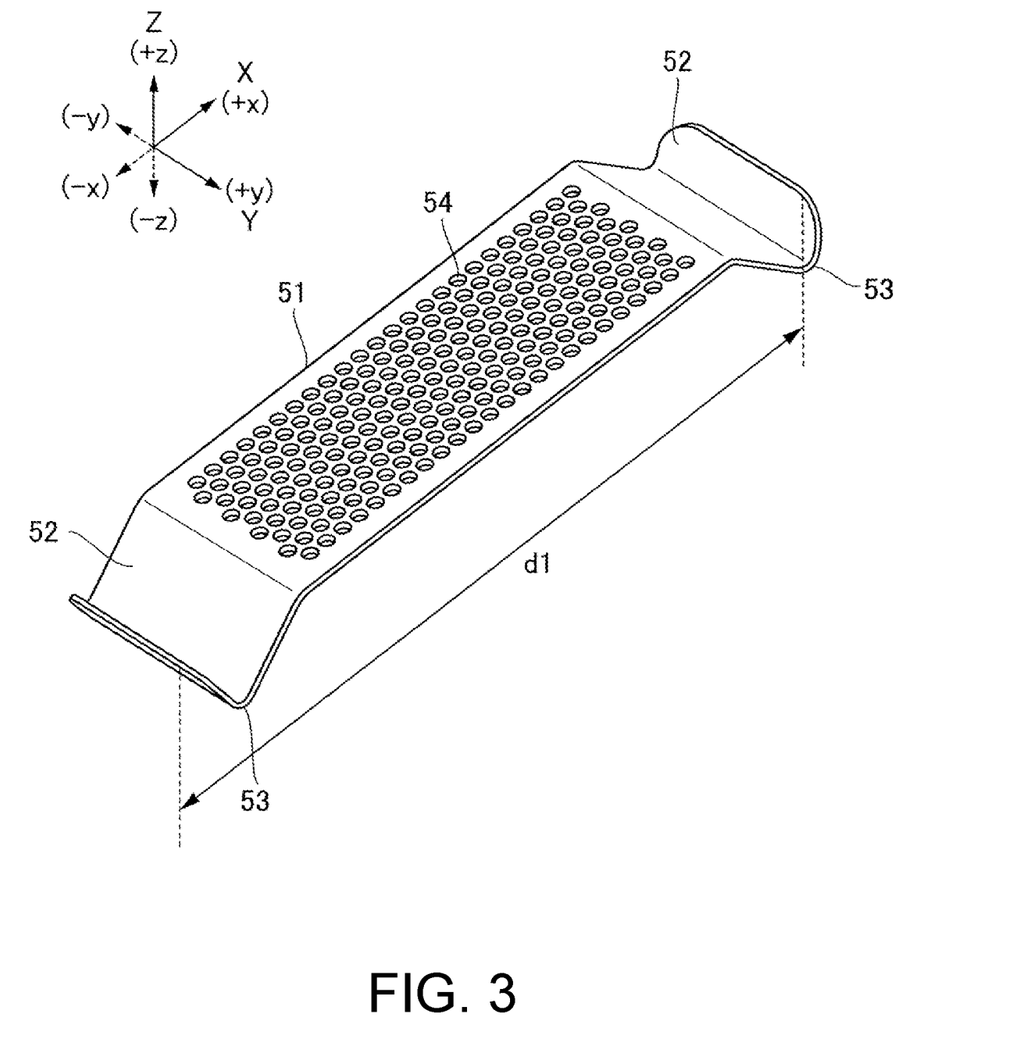
FIG. 3 is a perspective view of a filter before being attached to a first body.
Figure 4:
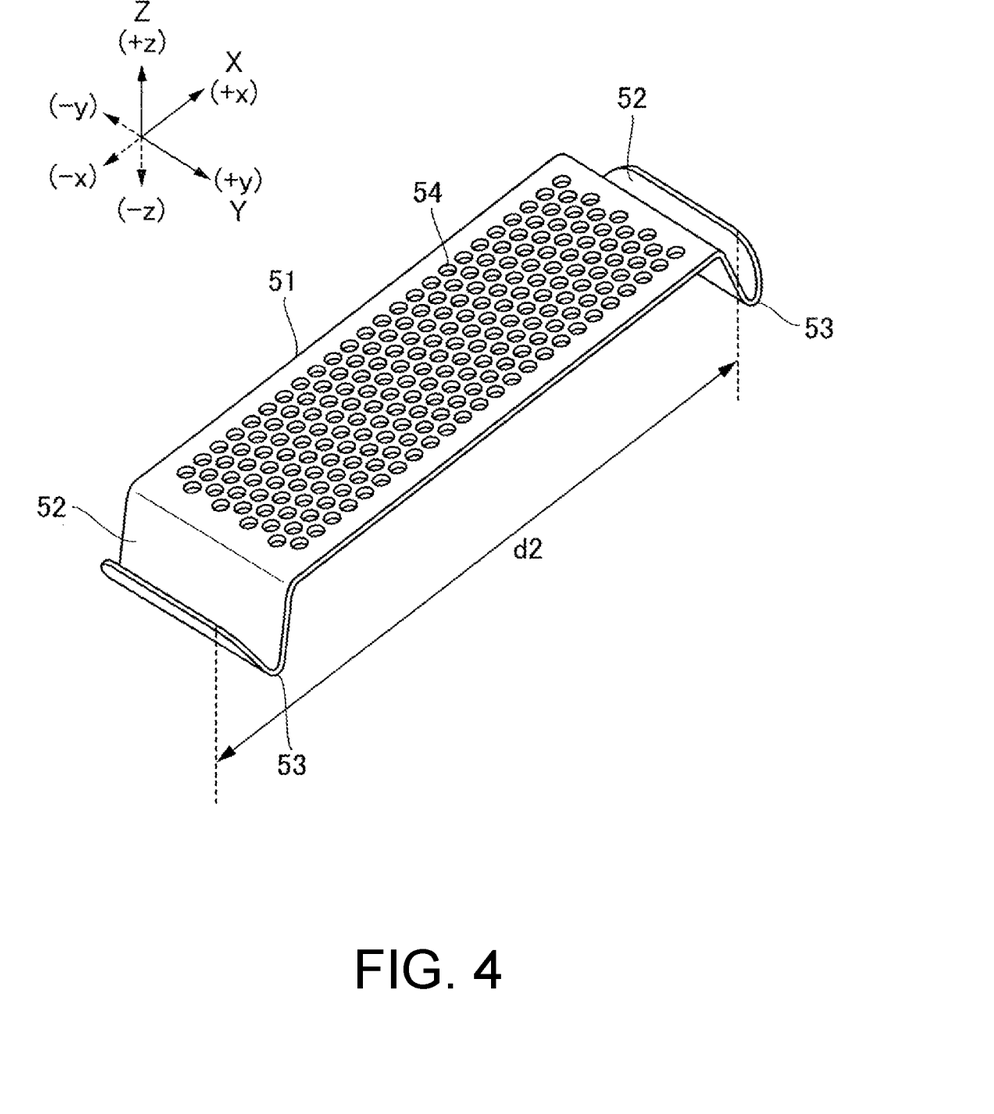
FIG. 4 is a perspective view of the filter after being attached to the first body.

FIG. 3 is a perspective view illustrating the filter 50 before being attached to the first body 30A. FIG. 4 is a perspective view illustrating the filter 50 after being attached to the first body 30A.

As illustrated in FIGS. 3 and 4, the filter 50 includes a plate-shaped filter part 51 and two leaf springs 52 extending from opposite end portions of the filter part 51. Each of the leaf springs 52 bends in a thickness direction of the filter part 51, that is, in the Z axis direction. In the present embodiment, the filter part 51 and the leaf springs 52 are formed in a single member, but they may be separate members.

The filter part 51 is a plate-shaped member in which a plurality of holes 54 are provided. An area of a region in which the plurality of holes 54 are provided in the plate-shaped member is equal to or greater than an area of the opening of the first oil passage 331. Thereby, all the oil in the first oil passage 331 can be caused to pass through the holes 54 of the filter part 51, and thus foreign matter in the oil can be filtered off by the filter 50. In the present embodiment, a size of the opening of the first oil passage 331 is restricted to be smaller than a size of the opening 35 of the separator plate 30C. Therefore, when the area of the region in which the holes 54 are provided is equal to or greater than the area of the opening 35, the area of the region in which the hole 54 is provided can be made equal to or greater than the area of the opening of the first oil passage 331.

Figure 5:
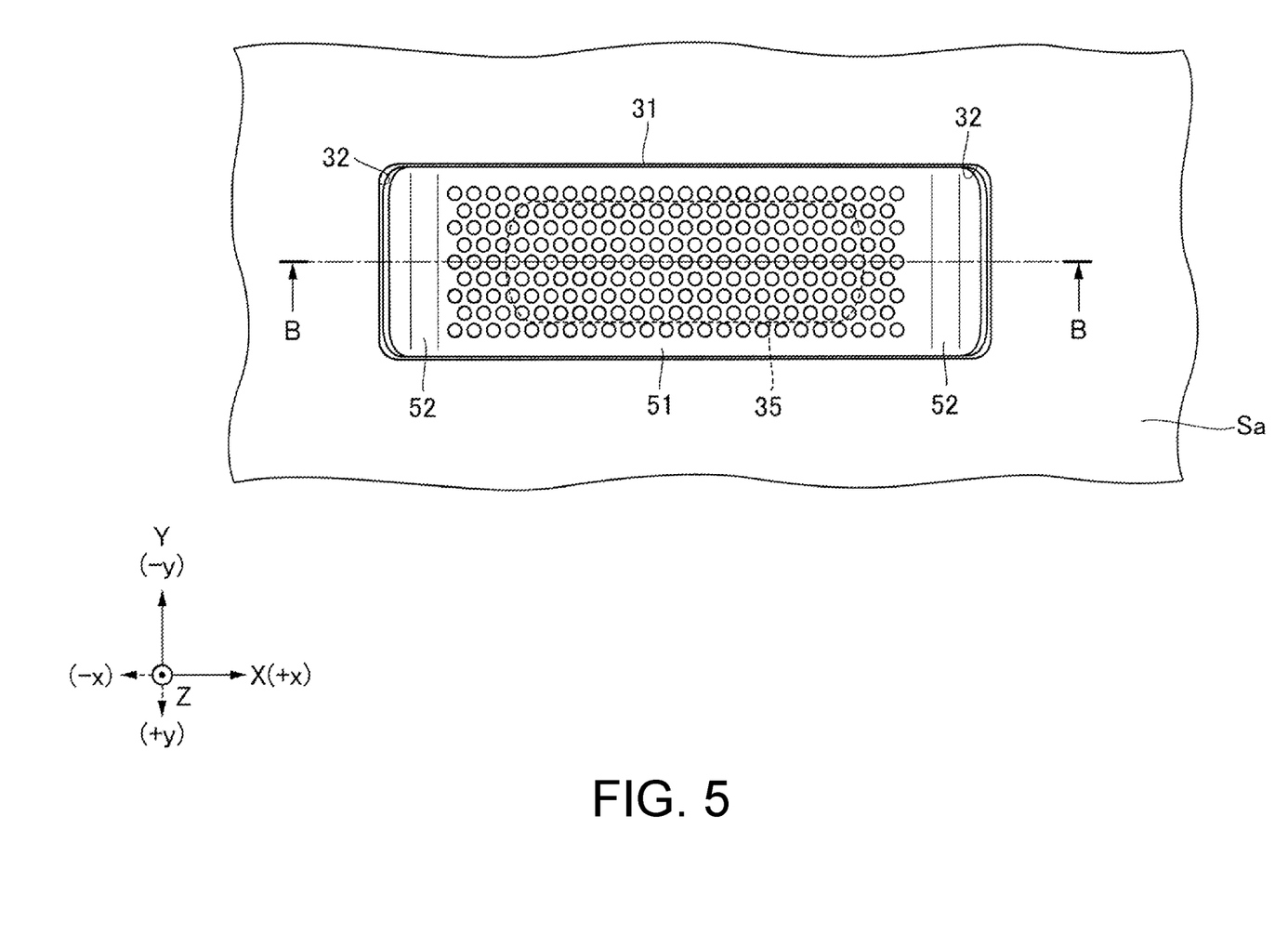
FIG. 5 is a top view of the filter provided to the first body.
Figure 6:
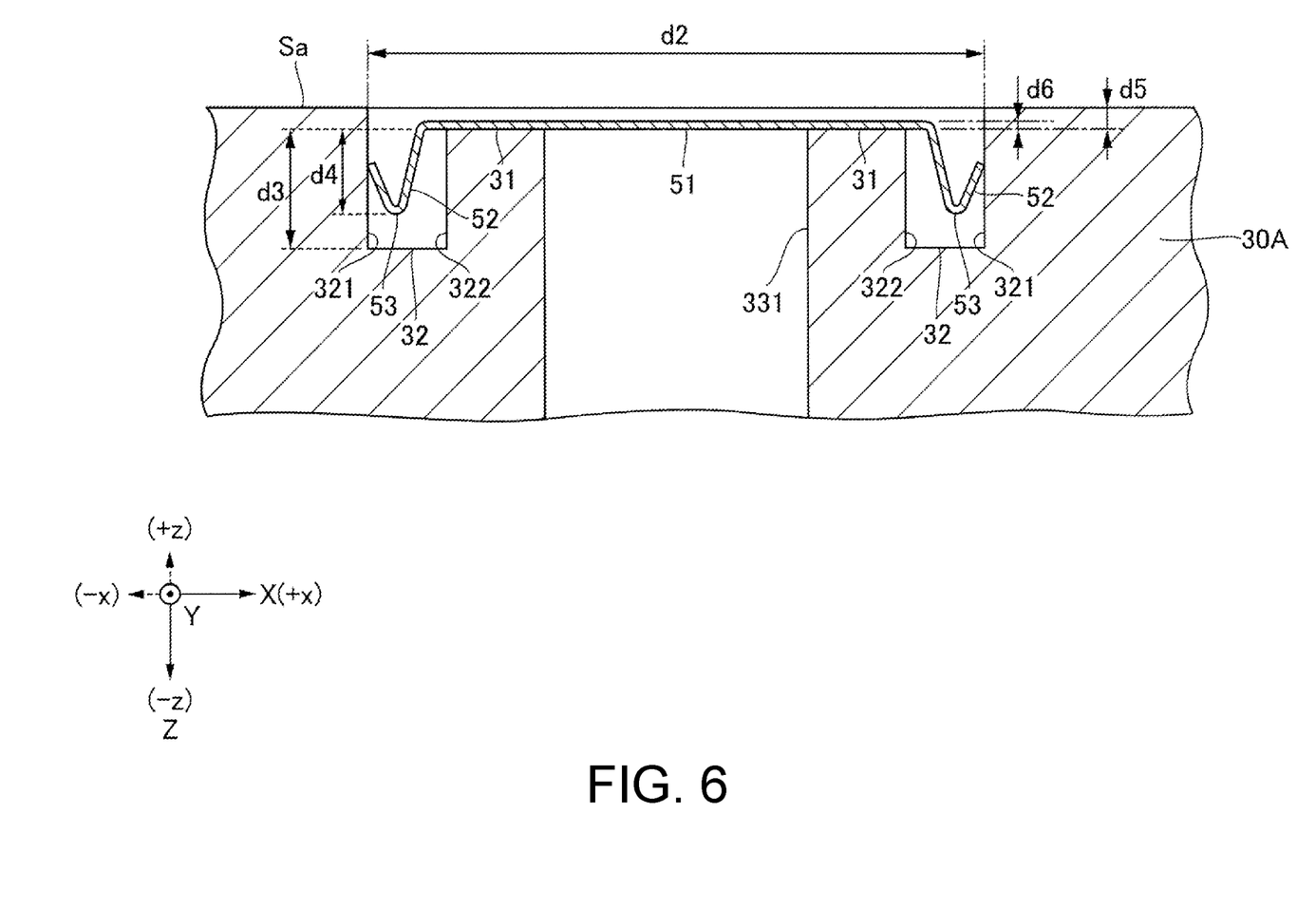
FIG. 6 is a cross-sectional view of the filter provided to the first body.

FIG. 5 is a top view illustrating the boundary surface Sa of the first body 30A on which the filter 50 is provided from the +z direction. FIG. 6 is a cross-sectional view of the filter 50 and the first body 30A taken along line B-B in FIG. 5.

As illustrated in FIGS. 5 and 6, the first accommodating part 31 is recessed in a direction away from the boundary surface Sa in a certain region surrounding the opening of the first oil passage 331. Also, the two second accommodating parts 32 are more recessed than the first accommodating part 31 in the direction away from the boundary surface Sa on outer sides of opposite end portions of the first accommodating part 31 with the first oil passage 331 interposed therebetween. The direction away from the boundary surface Sa refers to a direction from the boundary surface Sa, which is an outermost surface of the first body 30A, toward the inside of the first body 30A, and is the −z direction in the present embodiment.

As illustrated in FIGS. 5 and 6, the filter part 51 of the filter 50 is disposed in the first accommodating part 31. As illustrated in FIG. 2, the filter part 51 is sandwiched between the first body 30A and the second body 30B to cover the opening of the first oil passages 331. As illustrated in FIG. 6, one surface of the filter part 51 may be in contact with a bottom surface of the first accommodating part 31 so that foreign matter can be effectively removed.

As illustrated in FIG. 5, an area of the filter part 51 is equal to or greater than the area of the opening 35 of the separator plate 30C. Since the filter 50 can be brought into contact with the separator plate 30C in the periphery of the opening 35 and floating of the filter 50 can be prevented by the separator plate 30C, backlash of the filter 50 can be reduced.

The two leaf springs 52 of the filter 50 are respectively disposed in the two second accommodating parts 32. As illustrated in FIG. 6, an end portion of each of the leaf springs 52 comes into contact with a first wall surface 321 of each of the second accommodating parts 32 facing the first oil passage 331 side. In the present embodiment, as illustrated in FIG. 6, the leaf spring 52 includes a bent part 53 extending from an end portion of the filter part 51 toward a bottom surface side of the second accommodating part 32 and then folding back toward the boundary surface Sa side. The end portion of the leaf spring 52 folded back toward the boundary surface Sa comes into contact with the first wall surface 321 of the second accommodating part 32.

As illustrated in FIG. 3, a dimension of the filter 50 between opposite end portions thereof before being attached to the first body 30A is a dimension d1. In contrast, a dimension d2 between each first wall surface 321 of the two second accommodating parts 32 may be smaller than the dimension d1 of the filter 50. When the filter 50 is disposed in the first accommodating part 31 and the second accommodating part 32 which are smaller in dimension than that of the filter 50, the leaf spring 52 is elastically deformed to be bent and the dimension between opposite end portions of the filter 50 becomes a dimension d2 as illustrated in FIG. 4. Since each first wall surface 321 with which the end portion of each leaf spring 52 is in contact is biased by an elastic force of the bent leaf spring 52 in a direction away from the first oil passage 331, backlash due to positional deviation of the filter 50 can be reduced.

A side surface of the leaf spring 52 from the bent part 53 to the end portion that comes into contact with the first wall surface 321 of the second accommodating part 32 may come into contact with the first wall surface 321. Alternatively, a side surface of the leaf spring 52 from an end portion on the filter part 51 side to the bent part 53 may come into contact with a second wall surface 322 of the second accommodating part 32. The second wall surface 322 is a wall surface facing the first wall surface 321. When a contact area of the leaf spring 52 with respect to the second accommodating part 32 is made to increase, a frictional force between the filter 50 and the second accommodating part 32 is increased, and thereby a structure in which it is even harder for the filter 50 to fall off can be provided.

A dimension d3 from the bottom surface of the first accommodating part 31 to the bottom surface of the second accommodating part 32 is greater than a dimension d4 of the leaf spring 52 from a bottom surface of the filter part 51 to the bent part 53. Since the leaf spring 52 is accommodated on the boundary surface Sa side with respect to the bottom surface of the second accommodating part 32, it is possible to prevent the leaf spring 52 from coming into contact with the bottom surface and floating the filter 50.

As illustrated in FIG. 6, a dimension d5 from the bottom surface of the first accommodating part 31 to the boundary surface Sa is equal to or greater than a thickness d6 of the filter part 51. Since the recess of the first accommodating part 31 has a depth equal to or greater than the thickness of the filter part 51, the filter 50 can be accommodated further inside the first body 30A with respect to the boundary surface Sa. The filter 50 can be prevented from floating from the boundary surface Sa, and the first body 30A and the second body 30B can be brought into close contact with each other at the boundary surface Sa with the separator plate 30C interposed therebetween.

Between the first body 30A and the second body 30B, the filter 50 may be provided in the first body 30A in which the boundary surface Sa is positioned on an upper side in the direction of gravity. In a case in which the filter 50 is attached to the first body 30A, when a load is applied toward a lower side in the direction of gravity, the boundary surface Sa is positioned on the upper side in the direction of gravity from the first accommodating part 31 and the second accommodating part 32, the filter 50 can be inserted. The load can be easily applied and thus an attachment operation of the filter 50 becomes very easy.

(1) As described above, according to the control valve device 10 of the present embodiment, the filter part 51 and the leaf springs 52 of the filter 50 can be disposed in the first accommodating part 31 and the second accommodating parts 32 which are recesses from the boundary surface Sa of the first body 30A. Therefore, the attachment can be performed simply with a simple operation of insertion from the boundary surface Sa side. Since the filter part 51 is sandwiched between the first body 30A and the second body 30B and the leaf spring 52 comes into contact with the first wall surface 321 of the second accommodating part 32, it is possible to prevent the filter 50 from falling off from the valve body 30. Accordingly, the attachment operation of the filter 50 can be simplified, and the attached filter 50 can be prevented from falling off.

(2) The leaf spring 52 of the present embodiment comes into contact with the first wall surface 321 of the second accommodating part 32 and biases the first wall surface 321 in a direction away from the first oil passage 331. A position of the filter 50 can be fixed by the biasing and positional deviation of the filter 50 can be inhibited.

(3) Also, the leaf spring 52 includes the bent part 53 extending from the end portion of the filter part 51 toward the bottom surface side of the second accommodating part 32 and then folding back toward the boundary surface Sa side, and the folded-back end portion comes into contact with the first wall surface 321. Since the bent part 53 protrudes in the same direction as an insertion direction when the filter 50 is accommodated in the first accommodating part 31 and the second accommodating part 32, the insertion operation is further facilitated. Further, since the end portion of the leaf spring 52 protrudes toward the boundary surface Sa side and comes into contact with the first wall surface 321, the position of the filter 50 cannot easily deviate to the boundary surface Sa side and the positional deviation of the filter 50 can be more easily inhibited.

(4) The first body 30A includes the two first oil passages 331 communicating with the second body 30B. Therefore, in the first body 30A, the filter 50, the first accommodating part 31 and the two second accommodating parts 32 are provided for each first oil passage 331, and the opening of each first oil passage 331 is covered by each filter 50. In this manner, even when a plurality of filters 50 are required to be attached to a plurality of first oil passages 331, since the attachment operation of the filter 50 is simple according to the present embodiment, the valve body 30 in which the filter 50 can be prevented from falling off can be efficiently assembled.

While exemplary embodiments of the discloser have been described above, the disclosure is not limited to these embodiments, and various variations and modifications can be made within the gist of the scope of the disclosure.

For example, while an example of the control valve device 10 for opening and closing an oil passage through which oil flows has been described in the above embodiment, the disclosure is not limited to oil and can be implemented as long as it is a control valve device for opening and closing a flow path for a fluid. Further, the disclosure can be implemented also in a control valve device that opens and closes one oil passage using a valve element other than the spool valve.

Also, while the leaf spring 52 includes one bent part 53 in the above-described embodiment, the leaf spring 52 may be configured to have a plurality of bent parts 53 by being bent a plurality of times in a thickness direction of the filter part 51. Since the leaf spring 52 that has been bent a plurality of times has a strong elastic force when it is elastically deformed, the leaf spring 52 can bias the first wall surface 321 more strongly and positional deviation thereof can be further inhibited.

What is claimed is:

1. A control valve device comprising:
   a valve body provided with a flow path for a fluid and including a valve element that opens and closes the flow path, wherein
   the valve body includes:
   a first body; and
   a second body stacked on the first body, wherein
   a first oil passage opening at a first boundary surface in the first body adjacent to the second body is provided in the first body,
   a second oil passage which is a flow path opening at a second boundary surface in the second body adjacent to the first body is provided in the second body,
   the first body further includes:
   a filter covering an opening of the first oil passage;
   a first accommodating part recessed in a direction away from the first boundary surface at a certain region surrounding the opening of the first oil passage; and
   two second accommodating parts which are more recessed than the first accommodating part in the direction away from the first boundary surface on outer sides of opposite end portions of the first accommodating part with the first oil passage interposed therebetween,
   the filter includes:
   a plate-shaped filter part; and
   two leaf springs extending from opposite end portions of the filter part and bent in a thickness direction of the filter part, wherein
   the filter part is disposed in the first accommodating part and sandwiched between the first body and the second body to cover the opening of the first oil passage, and
   the two leaf springs are respectively disposed in the two second accommodating parts, and an end portion of each of the leaf springs comes into contact with a first wall surface of each of the second accommodating parts facing a first oil passage side.

2. The control valve device according to claim 1, wherein each end portion of the two leaf springs comes into contact with each first wall surface of the two second accommodating parts and biases each first wall surface in a direction away from the first oil passage.

3. The control valve device according to claim 1, wherein a dimension between each first wall surface of the two second accommodating parts is smaller than a dimension between opposite end portions of the filter.

4. The control valve device according to claim 2, wherein a dimension between each first wall surface of the two second accommodating parts is smaller than a dimension between opposite end portions of the filter.

5. The control valve device according to claim 1, wherein each of the leaf springs includes a bent part extending from each end portion of the filter part toward a bottom surface side of each of the second accommodating parts and folding back toward a first boundary surface side, and
   the end portion of each of the leaf springs folded back toward the first boundary surface side comes into contact with the first wall surface of each of the second accommodating parts.

6. The control valve device according to claim 5, wherein the leaf spring includes a side surface from the bent part of the leaf spring to the end portion of the leaf spring that comes into contact with the first wall surface of the second accommodating part, wherein the side surface of the leaf spring comes into contact with the first wall surface, or
   the leaf spring includes a side surface from an end portion of the leaf spring on a filter part side to the bent part of the leaf spring, wherein the side surface of the leaf spring comes into contact with a second wall surface of the second accommodating part.

7. The control valve device according to claim 5, wherein a dimension from a bottom surface of the first accommodating part to the bottom surface of the second accommodating part is greater than a dimension of the leaf spring from a bottom surface of the filter part to the bent part.

8. The control valve device according to claim 1, wherein a dimension from a bottom surface of the first accommodating part to the first boundary surface is equal to or greater than a thickness of the filter part.

9. The control valve device according to claim 1, wherein the valve body includes a separator plate between the first body and the second body,
   the separator plate includes an opening that communicates with both the first oil passage of the first body and the second oil passage of the second body, and
   an area of the filter part is equal to or greater than an area of the opening of the separator plate.

10. The control valve device according to claim 1, wherein
    the filter part is a plate-shaped member in which a plurality of holes are provided, and
    an area of a region in which the plurality of holes are provided in the plate-shaped member is equal to or greater than an area of the opening of the first oil passage.

11. The control valve device according to claim 1, wherein
    the first body includes:
    a plurality of first oil passages;
    a plurality of filters which respectively covers openings of the plurality of first oil passages; and
    a plurality of first accommodating parts and a plurality of second accommodating parts in which the plurality of filters are respectively disposed.

12. The control valve device according to claim 11, wherein the valve element is a spool valve opening and closing the plurality of first oil passages.

13. The control valve device according to claim 1, wherein the filter is provided on a body of the first body and the second body in which the first boundary surface or the second boundary surface is positioned on an upper side of the body in the direction of gravity.

* * * * *